United States Patent
Oyama

(10) Patent No.: US 11,370,425 B2
(45) Date of Patent: Jun. 28, 2022

(54) TRAVELING CONTROLLER FOR VEHICLE

(71) Applicant: SUBARU CORPORATION, Tokyo (JP)

(72) Inventor: Hajime Oyama, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 305 days.

(21) Appl. No.: 15/915,735

(22) Filed: Mar. 8, 2018

(65) Prior Publication Data

US 2018/0281790 A1    Oct. 4, 2018

(30) Foreign Application Priority Data

Mar. 31, 2017 (JP) .............................. JP2017-070132

(51) Int. Cl.
*B60W 30/12* (2020.01)
*G05D 1/02* (2020.01)
(Continued)

(52) U.S. Cl.
CPC ............ *B60W 30/12* (2013.01); *B60W 10/06* (2013.01); *B60W 10/18* (2013.01); *B60W 10/20* (2013.01);
(Continued)

(58) Field of Classification Search
CPC ...... B60W 30/12; B60W 10/06; B60W 10/18; B60W 10/20; B60W 40/10;
(Continued)

(56) References Cited

U.S. PATENT DOCUMENTS 8,949,016 B1 * 2/2015 Ferguson .............. B60W 30/00
340/436
8,996,197 B2 * 3/2015 Joh ........................ G01C 21/30
701/1

(Continued)

FOREIGN PATENT DOCUMENTS

JP       2013-097714 A    5/2013

*Primary Examiner* — Christian Chace
*Assistant Examiner* — Aaron C Smith
(74) *Attorney, Agent, or Firm* — McDermott Will & Emery LLP

(57) ABSTRACT

A traveling controller for vehicle includes a first computing unit, a traveling control unit, a first calculating unit, a second calculating unit, and a second computing unit. The first calculating unit is configured to calculate estimated positions. The second calculating unit is configured to calculate estimated position reliability on the basis of pieces of positional information, including information on one or more estimated positions. The second computing unit is configured to compute control information on the basis of one or more estimated positions when lane line information is unobtainable. The first calculating unit is configured to calculate one or more estimated positions on the basis of a position on map information of an own vehicle newly calculated on the basis of a planimetric feature acquired as traveling environment information, and the traveling control unit is configured to continue a traveling control until the estimated position reliability becomes equal to or less than a threshold, when the lane line information is unobtainable.

14 Claims, 5 Drawing Sheets

(51) Int. Cl.
*B60W 10/06* (2006.01)
*B60W 10/18* (2012.01)
*B60W 10/20* (2006.01)
*G08G 1/16* (2006.01)
*B60W 40/10* (2012.01)

(52) U.S. Cl.
CPC ........... *B60W 40/10* (2013.01); *G05D 1/0212* (2013.01); *G05D 1/0274* (2013.01); *G08G 1/167* (2013.01); *B60W 2554/00* (2020.02); *B60W 2710/06* (2013.01); *B60W 2710/18* (2013.01); *B60W 2710/20* (2013.01); *G05D 2201/0213* (2013.01)

(58) Field of Classification Search
CPC ......... B60W 2710/20; B60W 2710/06; B60W 2710/18; B60W 10/188; B60W 30/0956; B60W 2710/0616; B60W 2710/182; B60W 2710/202; B60W 2552/20; B60W 2552/30; B60W 2555/60; B60W 2555/20; B60W 30/02; B60W 2554/00; G05D 1/0212; G05D 1/0274; G05D 2201/0213; G08G 1/167; G08G 1/207; B60B 2900/325; G01S 19/42; G01S 19/52; G01S 5/0244; G01S 19/396; A61B 5/7221; G01R 31/003; G01R 31/28; G05B 19/4184; G05B 2219/33058; G05B 2219/34352; G05B 2219/35033; G06F 11/008; G06F 21/51; G06F 2119/02; G06F 2212/1032; G21Y 2002/206; G08B 29/185; G01C 21/3658; G01N 2021/8912; G06K 9/00798; G06T 7/20; G06T 2207/30256; G06V 20/588; H01L 22/30; H01L 2027/11864; H02H 3/05; H02H 2003/007; H02H 2203/20; H04B 1/74; H03K 19/003; H03K 17/9502; H03K 19/17764; H03K 2217/94116; H03K 2217/960705; H02J 2003/07; H02J 2203/20; H03M 13/45; H03M 13/41; H03F 1/52; H03F 1/542; H04L 1/22; H04L 12/1863; H04L 12/2435; H04L 12/5875; H04L 25/067; H04L 25/068; H04L 25/069; H04L 25/03178; H04L 41/0836; H04L 51/30; H04N 19/139; H04N 19/521; H05K 10/00

See application file for complete search history.

(56) References Cited

U.S. PATENT DOCUMENTS

| 2010/0191461 | A1* | 7/2010 | Zeng | G01S 13/931 |
| | | | | 701/532 |
| 2015/0175070 | A1* | 6/2015 | Attard | B60R 1/00 |
| | | | | 340/439 |
| 2016/0121889 | A1* | 5/2016 | Shimomura | B60W 50/14 |
| | | | | 701/41 |
| 2017/0008521 | A1* | 1/2017 | Braunstein | G01C 21/32 |

* cited by examiner

TRAVELING CONTROLLER FOR VEHICLE

CROSS-REFERENCE TO RELATED APPLICATION

The present application claims priority from Japanese Patent Application No. 2017-070132 filed on Mar. 31, 2017, the entire contents of which are hereby incorporated by reference.

BACKGROUND

The technology relates to a traveling controller for vehicle that generates a target course along which an own vehicle is to travel and so controls the own vehicle as to travel along the target course.

Various vehicle-related proposals have been proposed and put into practical use on automatic driving techniques that allow a driver to drive more comfortably. For example, Japanese Unexamined Patent Application Publication (JP-A) No. 2013-97714 discloses a technique in which a lane width of a lane recognized from an image is compared with a lane width, obtained from map information in relation to a position of the own vehicle, to thereby determine whether the lane recognized from the image has been recognized erroneously. The image is captured by an in-vehicle camera, and the own vehicle position is detected on the basis of GPS information. In the technique disclosed in JP-A No. 2013-97714, when it is determined that the lane recognized from the image has been recognized erroneously, a lane line located on the side on which the lane has been erroneously recognized is determined by means of a lateral position of a preceding vehicle recognized from an image captured by a camera that captures a region in front of the own vehicle. The technique disclosed in JP-A No. 2013-97714 thus performs a lane keeping control through correcting, on the basis of a result of the determination, a target lateral position directed to keeping of the lane.

SUMMARY

An aspect of the technology provides a traveling controller for vehicle. The traveling controller includes: a first computing unit configured to compute control information that is directed to a traveling control of an own vehicle, on a basis of map information, positioning information that indicates a position of the own vehicle, and lane line information acquired as traveling environment information and related to a lane line ahead of the own vehicle; a traveling control unit configured to perform the traveling control of the own vehicle, on a basis of the control information; a first calculating unit configured to calculate a plurality of estimated positions, on a basis of a plurality of computing methods that are based on information on a most-recent position on the map information of the own vehicle, in which the most-recent position of the own vehicle is calculated on a basis of the lane line information, and the estimated positions are each related to a current position of the own vehicle; a second calculating unit configured to calculate cumulatively-variable estimated position reliability, on a basis of a result of a comparison between pieces of positional information, including information on one or more of the plurality of estimated positions; and a second computing unit configured to compute the control information, on a basis of one or more of the plurality of estimated positions, in which the second computing unit computes the control information when the lane line information is unobtainable. The first calculating unit is configured to calculates, on a condition that a position on the map information of the own vehicle is newly calculated on a basis of information on a planimetric feature acquired as the traveling environment information, one or more of the plurality of estimated positions on a basis of information on the newly-calculated position of the own vehicle, when the lane line information is unobtainable, and the traveling control unit is configured to continue the traveling control until the estimated position reliability becomes equal to or less than a threshold, when the lane line information is unobtainable.

An aspect of the technology provides a traveling controller for vehicle. The traveling controller includes circuitry configured to compute control information that is directed to a traveling control of an own vehicle, on a basis of map information, positioning information that indicates a position of the own vehicle, and lane line information acquired as traveling environment information and related to a lane line ahead of the own vehicle, perform the traveling control of the own vehicle, on a basis of the control information, calculate a plurality of estimated positions, on a basis of a plurality of computing methods that are based on information on a most-recent position on the map information of the own vehicle, in which the most-recent position of the own vehicle is calculated on a basis of the lane line information, and the estimated positions are each related to a current position of the own vehicle, calculate cumulatively-variable estimated position reliability, on a basis of a result of a comparison between pieces of positional information, including information on one or more of the plurality of estimated positions, compute the control information, on a basis of one or more of the plurality of estimated positions, when the lane line information is unobtainable, calculate, on a condition that a position on the map information of the own vehicle is newly calculated on a basis of information on a planimetric feature acquired as the traveling environment information, one or more of the plurality of estimated positions on a basis of information on the newly-calculated position of the own vehicle, when the lane line information is unobtainable, and continue the traveling control until the estimated position reliability becomes equal to or less than a threshold, when the lane line information is unobtainable.

DETAILED DESCRIPTION

Figure 1:
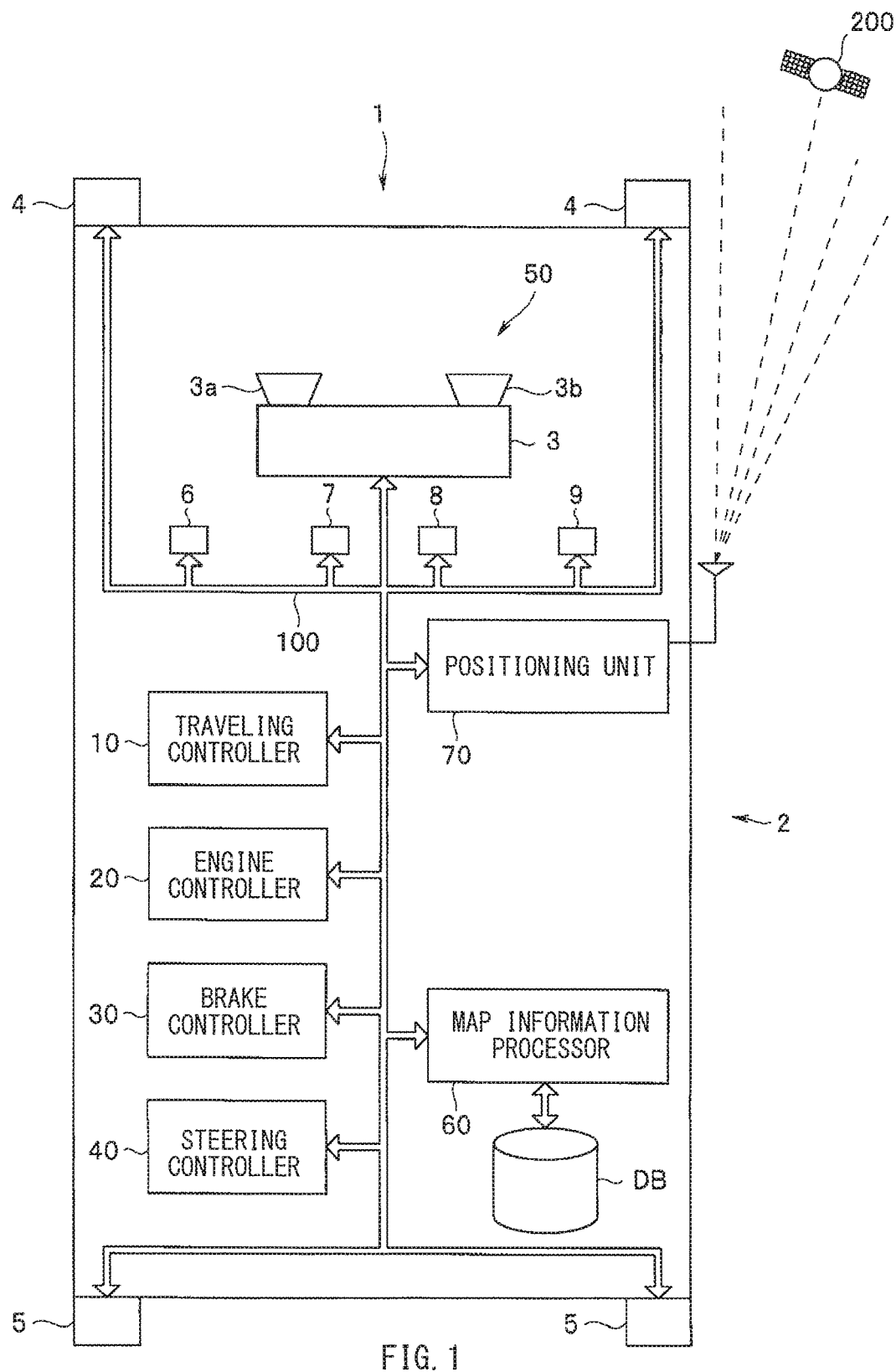
FIG. 1 is a diagram illustrating an example of a vehicle provided with a vehicle control system that includes a traveling controller for vehicle according to an implementation of the technology.

In general, it is desirable that a traveling controller for vehicle be able to continue an appropriate traveling control.

It is desirable to provide a traveling controller for vehicle that makes it possible to continue an appropriate traveling control.

In the following, some implementations of the technology are described in detail with reference to the accompanying drawings. FIG. 1 to FIG. 5 illustrate one implementation of the technology.

Note that the following description is directed to an illustrative example of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementation which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

Referring to FIG. 1, a vehicle 1, or an "own vehicle" 1, may be provided with a vehicle control system 2 that mainly performs a traveling control. The vehicle 1 may be an automobile, although any implementation of the technology is applicable to any vehicle including the automobile.

The vehicle control system 2 may include devices such as a traveling controller 10, an engine controller 20, a brake controller 30, a steering controller 40, a traveling environment recognizer 50, a map information processor 60, and a positioning unit 70. These devices may be coupled to each other through a communication bus 100 that forms a vehicle-mounted network.

The communication bus 100, and the controllers coupled thereto, may be coupled to various sensors that detect driving states, various setting switches, and various operating switches. FIG. 1 illustrates an implementation in which a vehicle speed sensor 6, a yaw rate sensor 7, a direction sensor 8, and a steering angle sensor 9 are coupled to the communication bus 100. The vehicle speed sensor 6 may detect a speed of the own vehicle 1. The yaw rate sensor 7 may detect a yaw rate. The direction sensor 8 may be a gyro sensor without limitation, and may detect a direction of travel of the own vehicle 1. The steering angle sensor 9 may detect a steering angle.

The traveling controller 10 may perform a driving assist on a driving operation performed by a driver. The driving assist may include automatic driving in which the driver's operation is not required. The traveling controller 10 may execute various types of driving assist control. Non-limiting examples of the driving assist control may include: an adaptive cruise control (ACC) that allows for functions such as preceding-vehicle overtaking, lane keeping, or expressway merging; an obstacle avoidance control; a control for temporary stop and intersection passage by means of detection of a road sign and a traffic signal; and a control for emergency evacuation toward on a road shoulder upon occurrence of abnormality. These types of driving assist control may be executed, for example, on the basis of: traveling environment information related to a traveling environment around the own vehicle 1 recognized by the traveling environment recognizer 50; map information obtained from the map information processor 60; positional information or "positioning information" related to a position of the own vehicle 1 determined by the positioning unit 70; and information on detection of the driving states of the own vehicle 1 detected by the various sensors. In one implementation, the traveling environment recognizer 50 may serve as a traveling environment information acquiring unit. In one implementation, the map information processor 60 may serve as a "map information storage". In one implementation, the positioning unit 70 may serve as a "positioning unit".

The engine controller 20 may control an operating state of an unillustrated engine provided in the own vehicle 1. For example, the engine controller 20 may perform various controls such as a fuel injection control, an ignition timing control, or an electronic throttle valve position control. These example controls may be performed on the basis of intake air volume, a throttle position, an engine coolant temperature, an intake air temperature, an air-fuel ratio, a crank angle, an accelerator position, and any other vehicle information, for example.

The brake controller 30 may control an unillustrated brake device of four wheels of the own vehicle 1 independently of the driver's braking operation, on the basis of a brake switch status, a rotational speed of each of the four wheels, the steering angle, the yaw rate, and any other vehicle information, for example. When information on braking force for each wheel is received from the traveling controller 10, the brake controller 30 may calculate, on the basis of information on the braking force, a brake fluid pressure to be applied to each wheel to actuate an unillustrated brake driver. By actuating the brake driver on the basis of the calculated brake fluid pressure, the brake controller 30 may perform a yaw moment control and a yaw brake control that control a yaw moment to be added to the own vehicle 1, such as an antilock brake system (ABS) control or an antiskid control.

The steering controller 40 may control assist torque generated by an unillustrated electric power steering motor provided in a steering system of the own vehicle 1, on the basis of the vehicle speed, the steering torque based on an input received from the driver of the own vehicle 1, the steering angle, the yaw rate, and any other vehicle information, for example. The steering controller 40 may allow for a lane keeping control that keeps the own vehicle 1 within a traveling lane and a lane deviation prevention control that prevents the own vehicle 1 from deviating from the traveling lane. The steering angle or the steering torque, necessary for the lane keeping control and the lane deviation prevention control, may be calculated by the traveling controller 10, and the calculated steering angle or the calculated steering torque may be supplied to the steering controller 40. The electric power steering motor may be driven and controlled in accordance with a control amount supplied to the steering controller 40.

The traveling environment recognizer 50 may include a camera device and a radar device. The camera device may capture an image of an environment outside the own vehicle 1, and may process thus-obtained image information. The camera device may be, for example but not limited to, a stereo camera, a monocular camera, or a color camera. The radar device may receive reflected waves derived from a three-dimensional object present around the own vehicle 1. The radar device may be, for example but not limited to, a LiDAR, a millimeter-wave radar, or a ultrasonic-wave radar. In the present implementation, the traveling environment recognizer 50 may include a stereo camera unit 3 as a main component of the traveling environment recognizer 50. The stereo camera unit 3 may perform stereo imaging of a region in front of the own vehicle 1, and may recognize an object three-dimensionally from the thus-obtained image information. The traveling environment recognizer 50 may further include lateral radar units 4 and rear radar units 5. The lateral radar units 4 may detect an object present in a region in front of and on the sides of the own vehicle 1. The rear radar units 5 may detect an object present at the rear of the own vehicle 1 by means of, for example but not limited to, microwaves.

The stereo camera unit 3 may be provided with a stereo camera including two cameras, i.e., right and left cameras 3a and 3b. For example, the right and left cameras 3a and 3b may be provided at a location that is an upper part of the vehicle interior, in the vicinity of a rearview mirror, and behind a windshield. The right and left cameras 3a and 3b each may include an imaging device such as a CCD or CMOS, and may have their respective shutters that are driven in synchronization with each other. The right and left cameras 3a and 3b may be fixed with a predetermined baseline provided therebetween.

The stereo camera unit 3 may be integrally provided with an image processor that performs a stereo image process on a pair of images captured by the right and left cameras 3a and 3b. By performing the stereo image process, the image processor may acquire information on a three-dimensional position, in real space, of an object present in front of the own vehicle 1, such as a preceding vehicle. On the basis of parallax data and an image coordinate value of the object obtained through the stereo image process, the three-dimensional position of the object may be converted into a coordinate value in the three-dimensional space, where a vehicle width direction, a vehicle height direction, and a vehicle length direction (i.e., a distance direction) correspond respectively to an X-axis direction, a Y-axis direction, and a Z-axis direction, and where a road surface directly below the middle of the stereo camera unit 3 is defined as a point of origin, for example.

For example, the stereo camera unit 3 may perform a stereo matching process on the pair of images captured by the right and left cameras 3a and 3b. By performing the stereo matching process, the stereo camera unit 3 may determine a pixel offset amount (i.e., a parallax) between corresponding positions in the respective right and left images and generate a distance image that represents a distribution of distance information determined from the pixel offset amount. Further, the stereo camera unit 3 may perform a known grouping process on the distribution of distance information to three-dimensionally recognize a factor. Non-limiting examples of the factor may include: a lane line of a road on which the own vehicle 1 travels, such as a white line or any other colored line; a preceding vehicle that travels ahead of the own vehicle 1; an oncoming vehicle that travels on the opposing lane; and various three-dimensional objects such as a roadside sign, a traffic signal, or an obstacle on the road. The recognized factor may be obtained as the traveling environment information.

The lateral radar units 4 each may be a proximity radar that detects an object present relatively close to the own vehicle 1. For example, the lateral radar units 4 may be disposed at right and left corners of a front bumper. The lateral radar units 4 may transmit radar waves such as microwaves or high-bandwidth millimeter waves to the outside and receive reflected waves derived from an object. Thus, the lateral radar units 4 may measure a distance to and a direction of the object present diagonally in front of the own vehicle 1, which is outside the field of view of the stereo camera unit 3.

The rear radar units 5 may be disposed at right and left corners of a rear bumper, for example. The rear radar units 5 may likewise transmit radar waves to the outside and receive the reflected waves derived from an object to thereby measure a distance to and a direction of the object present in a region directly and diagonally behind the own vehicle 1.

The map information processor 60 may be provided with a map database DB. The map information processor 60 may locate, on the basis of positional data (or the positioning information) of the own vehicle 1 determined by the positioning unit 70, the own vehicle position on map data (or the map information) of the map database DB, and may output the thus-located own vehicle position. For example, the map database DB may include map data directed to navigation. The map data directed to the navigation may be referenced when a vehicle traveling route guidance is performed, or when a current position of the own vehicle 1 is displayed. The map database DB may also include map data directed to a traveling control. The map data directed to the traveling control may be higher in detail than the map data directed to the navigation, and referenced when the driving assist control, including the automatic driving, is performed.

The map data directed to the navigation provided in the map database DB may contain a previous node and a subsequent node that are coupled to a current node via their respective links. Each link may contain information on a factor such as a traffic signal, a road sign, or a building. The high-definition map data directed to the traveling control may have a plurality of data points between any node and a subsequent node. Each of the data points may contain road shape data and traveling control data. The road shape data may be directed to a factor such as a curvature, a lane width, or a road shoulder width of a road along which the own vehicle 1 travels. The traveling control data may be directed to a factor such as a road azimuth, a type of lane line of the road, or the number of lanes. The data points each may contain the road shape data and the traveling control data, together with attribute data that is related to a factor such as data reliability or data updated dates.

Further, the map information processor 60 may maintain and manage the map database DB and verify the nodes, the links, and the data points of the map database DB to thereby keep the latest state of the map database DB constantly. The map information processor 60 may also create and add new data for any region on the map database DB in which data is absent to thereby construct a more detailed map database DB. Updating of the map database DB and adding of the new data to the map database DB may be performed through checking the positional data determined by the positioning unit 70 against data stored in the map database DB, i.e., performed through map matching.

The positioning unit 70 may perform positioning of the own vehicle position by means of satellite navigation. The satellite navigation may perform positioning on the basis of signals transmitted from a plurality of satellites. For example, the positioning unit 70 may receive signals, transmitted from a plurality of navigation satellites 200, that include information related to satellites' orbits and the current time. The navigation satellites 200 may be GNSS satellites without limitation. On the basis of the received signals, the positioning unit 70 may perform the positioning of the own vehicle position as a three-dimensional absolute position. It is to be noted that only one navigation satellite is illustrated in FIG. 1 for illustration purpose.

Figure 2:
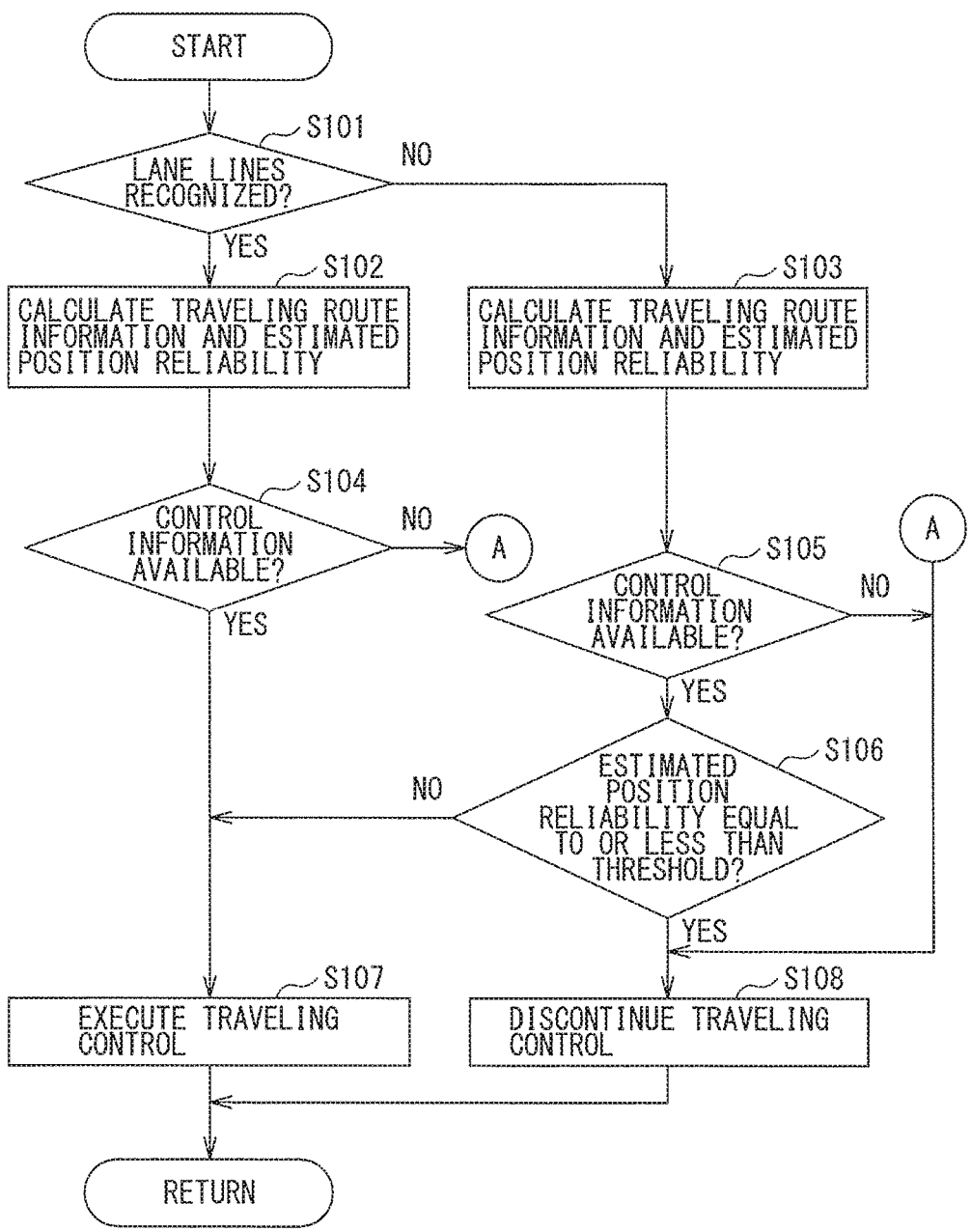
FIG. 2 is a flowchart illustrating an example of a traveling control routine.

A description is given next, with reference to a flowchart of a traveling control routine illustrated by way of example in FIG. 2, of an example of the traveling control to be executed by the traveling controller 10. In the present implementation, the traveling controller 10 may perform the following example processes to thereby achieve its functions as a control information computing unit, an abnormal-situation control information computing unit, a traveling control unit, an estimated position calculating unit, and an estimated position reliability calculating unit. In one implementation, the control information computing unit may serve as a "first computing unit". In one implementation, the abnormal-situation control information computing unit may serve as a "second computing unit". In one implementation, the traveling control unit may serve as a "traveling control unit". In one implementation, the estimated position calculating unit may serve as a "first calculating unit". In one implementation, the estimated position reliability calculating unit may serve as a "second calculating unit".

The traveling control routine may be repeatedly carried out for each set time. Upon start of the routine, the traveling controller 10 may first determine in step S101 whether the traveling environment recognizer 50 has properly recognized the lane lines that define the own vehicle traveling lane along which the own vehicle 1 travels.

A flow may proceed to step S102 when the traveling controller 10 determines in step S101 that the traveling environment recognizer 50 has properly recognized the lane lines (S101: YES). The flow may proceed to step S103 when the traveling controller 10 determines in step S101 that the traveling environment recognizer 50 has not properly recognized the lane lines due to snow accumulation, or due to any other factor that makes the traveling environment recognizer 50 difficult to properly recognize the lane lines (S101: NO).

When the flow proceeds to step S102 from step S101, the traveling controller 10 may compute control information directed to a control of the own vehicle 1 for a normal situation in which both lane line information of the own vehicle traveling lane and the positioning information of the own vehicle 1 have been acquired. Further, in step S102, the traveling controller 10 may calculate a plurality of estimated positions for the current own vehicle position on the basis of a plurality of computing methods that use information on a past position of the own vehicle 1. In addition, in step S102, the traveling controller 10 may calculate estimated position reliability on the basis of a result of comparison between pieces of positional information, including information on one or more of the estimated positions.

Figure 3:
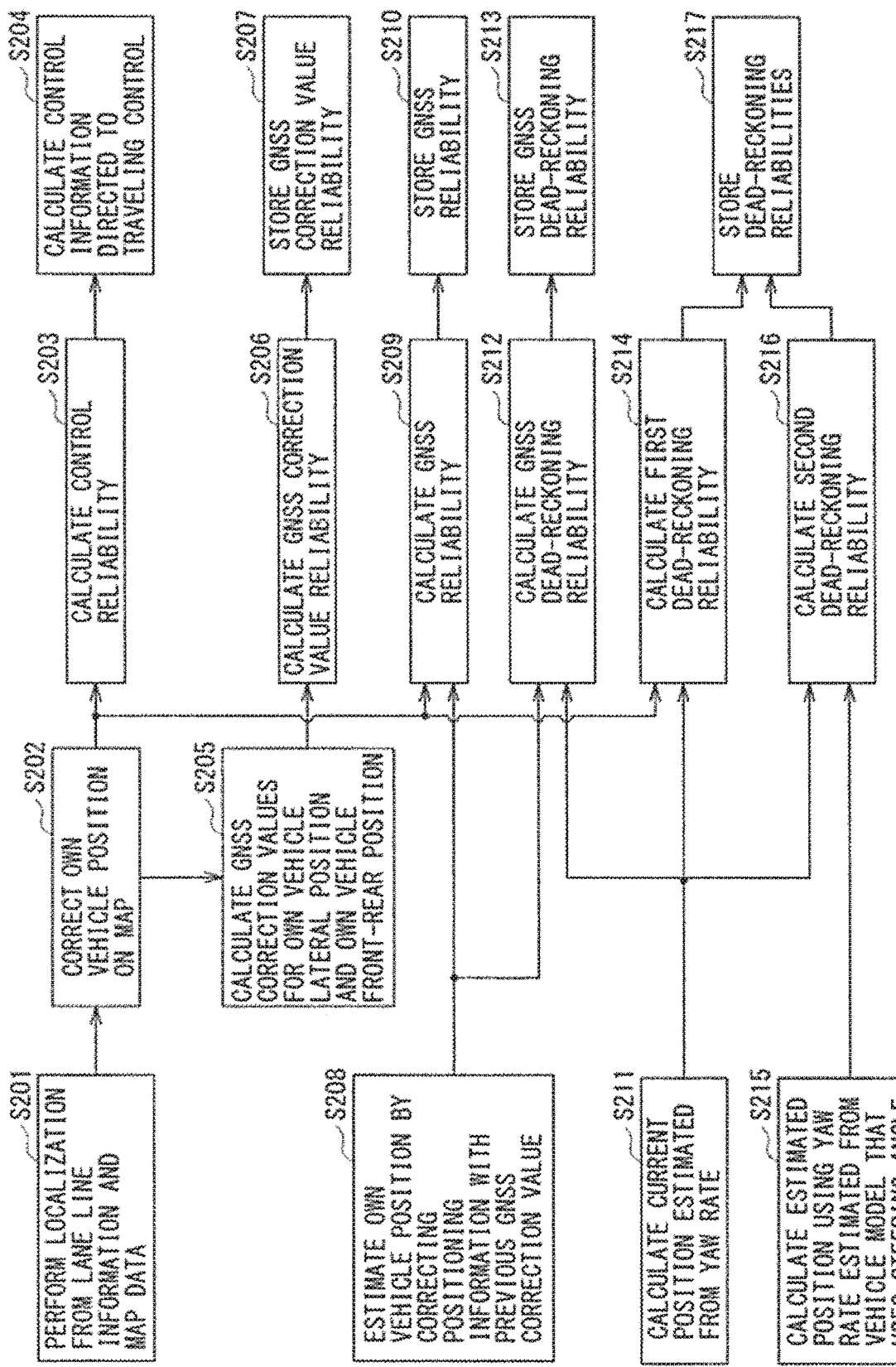
FIG. 3 is a diagram illustrating an example of a procedure for calculating traveling route information and estimated position reliability for a normal situation.

Processes performed as described above in step S102 may be performed in accordance with an example procedure illustrated in FIG. 3.

In step S201, the traveling controller 10 may perform localization on the basis of the lane lines and the map data.

For example, the traveling controller 10 may calculate a lateral position of the own vehicle 1 (i.e., an "own vehicle lateral position") in the own vehicle traveling lane on the map data, through comparing a relative position with coordinates of the lane lines on the map data. The relative position may be a relative position between the own vehicle 1 and right and left lane lines recognized by the traveling environment recognizer 50. In addition, for example, when a branch starting point (i.e., a branching point) of a branch road is recognized ahead of the own vehicle 1 in the own vehicle traveling lane on the basis of the lane lines, the traveling controller 10 may calculate a front-rear position of the own vehicle 1 (i.e., an "own vehicle front-rear position") in the own vehicle traveling lane on the map data, through comparing a distance from the own vehicle 1 to the branching point with coordinates of the branching point on the map data. It is to be noted that, even when no branch road or any other factor exists ahead of the own vehicle 1 in the own vehicle traveling lane, it is also possible for the traveling controller 10 to calculate the own vehicle position (or the own vehicle front-rear position) in the own vehicle traveling lane on the map data, through comparing an azimuth of the own vehicle 1 determined from, for example, a curvature of the own vehicle traveling lane recognized by the traveling environment recognizer 50 with an azimuth determined from, for example, a curvature of the corresponding road on the map data.

In step S202, the traveling controller 10 may correct the positioning information acquired by the positioning unit 70, on the basis of the own vehicle position (i.e., coordinates) on the map data that has been localized in step S201.

In step S203, the traveling controller 10 may calculate control reliability directed to execution of the traveling control, on the basis of a comparison between, for example, a road shape that is determined from the lane lines recognized by the traveling environment recognizer 50 and a road shape, based on coordinates of the positioning information, on the map data. In this calculation of the control reliability, for example, a level of coincidence between the road shape (based on a factor such as a width or a curvature of a road) that is determined from the lane lines and the road shape (based on a factor such as a width or a curvature of the road) on the map data may be calculated by means of a predetermined method. A level of the thus-calculated control reliability may become higher as the level of coincidence becomes higher.

In step S204, when the control reliability calculated in step S203 is equal to or greater than a set threshold, the traveling controller 10 may set a target course directed to the execution of the traveling control (or the automatic driving control), and may calculate control information that is based on the set target course. For example, for the control information, the traveling controller 10 may calculate a control parameter such as a curvature, a yaw angle, or a lateral position which is based on the set target course.

Accordingly, in the normal situation in which both the lane line information of the own vehicle traveling lane and the positioning information of the own vehicle 1 have been acquired, the traveling controller 10 may calculate the control reliability by means of the lane line information and the positioning information. Further, in a case where the thus-calculated control reliability is equal to or greater than a predetermined threshold, the traveling controller 10 may calculate the control information directed to the execution of the traveling control after having located the own vehicle position.

In step S205, the traveling controller 10 may calculate deviations as GNSS correction values. The GNSS correction values may serve as correction values for the positioning information. For example, the traveling controller 10 may calculate a deviation between the lateral position of the own vehicle 1 on the map data determined from the coordinates of the own vehicle position localized in step S201 and the lateral position of the own vehicle 1 on the map data determined from the coordinates of a GNSS own vehicle position, which are based on the coordinates of the own vehicle position on the map data calculated from GNSS measurements. The traveling controller 10 may also calculate a deviation between the front-rear position of the own vehicle 1 on the map data determined from the coordinates of the own vehicle position localized in step S201 and the front-rear position of the own vehicle 1 on the map data determined from the coordinates of the GNSS own vehicle position.

In step S206, the traveling controller 10 may calculate GNSS correction value reliability on the basis of a comparison between the currently-calculated GNSS correction value and the previously-calculated GNSS correction value. In the present implementation, for example, the traveling controller 10 may calculate a reliability correction value that corresponds to a deviation between the previously-calculated GNSS correction value and the currently-calculated GNSS correction value, and may calculate new GNSS correction value reliability through adding the thus-calculated reliability correction value to a previous value of the GNSS correction value reliability. The thus-calculated reliability correction value may take a positive value when the deviation between the previously-calculated GNSS correction value and the currently-calculated GNSS correction value is equal to or less than a predetermined value, and may take a negative value when the same deviation is greater than the same predetermined value. Accordingly, a value of the thus-calculated GNSS correction value reliability may become higher as a state in which the deviation is equal to or less than the predetermined value lasts longer.

In step S207, the traveling controller 10 may store the GNSS correction value reliability calculated in step S206 in a memory provided in the traveling controller 10.

In step S208, the traveling controller 10 may calculate an estimated position for the current own vehicle position through correcting the positioning information currently acquired by the positioning unit 70 with the previous GNSS correction value. The previous GNSS correction value may be a piece of information on a past position of the own vehicle 1.

In step S209, the traveling controller 10 may calculate GNSS reliability as estimated position reliability, on the basis of a comparison between the own vehicle position localized in step S201 and the estimated position calculated in step S208, for example. In the present implementation, for example, the traveling controller 10 may calculate a reliability correction value that corresponds to a deviation between the own vehicle position localized in step S201 and the estimated position calculated in step S208, and may calculate new GNSS reliability through adding the thus-calculated reliability correction value to a previous value of the GNSS reliability. The thus-calculated reliability correction value may take a positive value when the aforementioned deviation between the own vehicle position localized in step S201 and the estimated position calculated in step S208 is equal to or less than a predetermined value, and may take a negative value when the same deviation is greater than the same predetermined value. Accordingly, a value of the GNSS reliability may cumulatively become higher as a state in which the deviation is equal to or less than the predetermined value lasts longer.

In step S210, the traveling controller 10 may store the GNSS reliability calculated in step S209 in the memory provided in the traveling controller 10.

In step S211, the traveling controller 10 may calculate (i.e., may perform dead-reckoning of) an estimated position for the current own vehicle position, on the basis of a kinetic state of the own vehicle 1 and the previously-localized own vehicle position. For example, the kinetic state of the own vehicle 1 may be calculated by means of the yaw rate.

In step S212, the traveling controller 10 may calculate GNSS dead-reckoning reliability as estimated position reliability, on the basis of a comparison between the estimated position calculated in step S208 and the estimated position calculated in step S211, for example. In the present implementation, for example, the traveling controller 10 may calculate a reliability correction value that corresponds to a deviation between the estimated position calculated in step S208 and the estimated position calculated in step S211, and may calculate new GNSS dead-reckoning reliability through adding the thus-calculated reliability correction value to a previous value of the GNSS dead-reckoning reliability. The thus-calculated reliability correction value may take a positive value when the aforementioned deviation between the estimated position calculated in step S208 and the estimated position calculated in step S211 is equal to or less than a predetermined value, and may take a negative value when the same deviation is greater than the same predetermined value. Accordingly, a value of the GNSS dead-reckoning reliability may cumulatively become higher as a state in which the deviation is equal to or less than the predetermined value lasts longer.

In step S213, the traveling controller 10 may store the GNSS dead-reckoning reliability calculated in step S212 in the memory provided in the traveling controller 10.

In step S214, the traveling controller 10 may calculate first dead-reckoning reliability as estimated position reliability, on the basis of a comparison between the own vehicle position localized in step S201 and the estimated position calculated in step S211, for example. In the present implementation, for example, the traveling controller 10 may calculate a reliability correction value that corresponds to a deviation between the own vehicle position localized in step S201 and the estimated position calculated in step S211, and may calculate new first dead-reckoning reliability through adding the thus-calculated reliability correction value to a previous value of the first dead-reckoning reliability. The thus-calculated reliability correction value may take a positive value when the aforementioned deviation between the own vehicle position localized in step S201 and the estimated position calculated in step S211 is equal to or less than a predetermined value, and may take a negative value when the same deviation is greater than the same predetermined value. Accordingly, a value of the first dead-reckoning reliability may cumulatively become higher as a state in which the deviation is equal to or less than the predetermined value lasts longer.

In step S215, the traveling controller 10 may estimate the yaw rate from, for example, a vehicle model that uses the steering angle. Further, the traveling controller 10 may calculate (i.e., may perform dead-reckoning of) an estimated position for the current own vehicle position, on the basis of a kinetic state of the own vehicle 1 and the previously-localized own vehicle position. For example, the kinetic state of the own vehicle 1 may be calculated by means of the estimated yaw rate.

In step S216, the traveling controller 10 may calculate second dead-reckoning reliability as estimated position reliability, on the basis of a comparison between the estimated position calculated in step S211 and the estimated position calculated in step S215. In the present implementation, for example, the traveling controller 10 may calculate a reliability correction value that corresponds to a deviation between the estimated position calculated in step S211 and the estimated position calculated in step S215, and may calculate new second dead-reckoning reliability through adding the thus-calculated reliability correction value to a previous value of the second dead-reckoning reliability. The thus-calculated reliability correction value may take a positive value when the aforementioned deviation between the estimated position calculated in step S211 and the estimated position calculated in step S215 is equal to or less than a predetermined value, and may take a negative value when the same deviation is greater than the same predetermined value. Accordingly, a value of the second dead-reckoning reliability may cumulatively become higher as a state in which the deviation is equal to or less than the predetermined value lasts longer.

In step S217, the traveling controller 10 may store the first dead-reckoning reliability calculated in step S210 and the second dead-reckoning reliability calculated in step S216 in the memory provided in the traveling controller 10.

When the flow proceeds to step S103 from step S101 in the flowchart illustrated in FIG. 2, the traveling controller 10 may compute control information directed to a control of the own vehicle 1 for an abnormal situation in which the lane line information of the own vehicle traveling lane is unobtainable due to, for example but not limited to, the snow accumulation. Further, in step S103, the traveling controller 10 may calculate a plurality of estimated positions for the current own vehicle position on the basis of a plurality of computing methods that use information on a past position of the own vehicle 1. In addition, in step S103, the traveling controller 10 may calculate estimated position reliability on the basis of a result of comparison between pieces of positional information, including information on one or more of the estimated positions.

Figure 4:
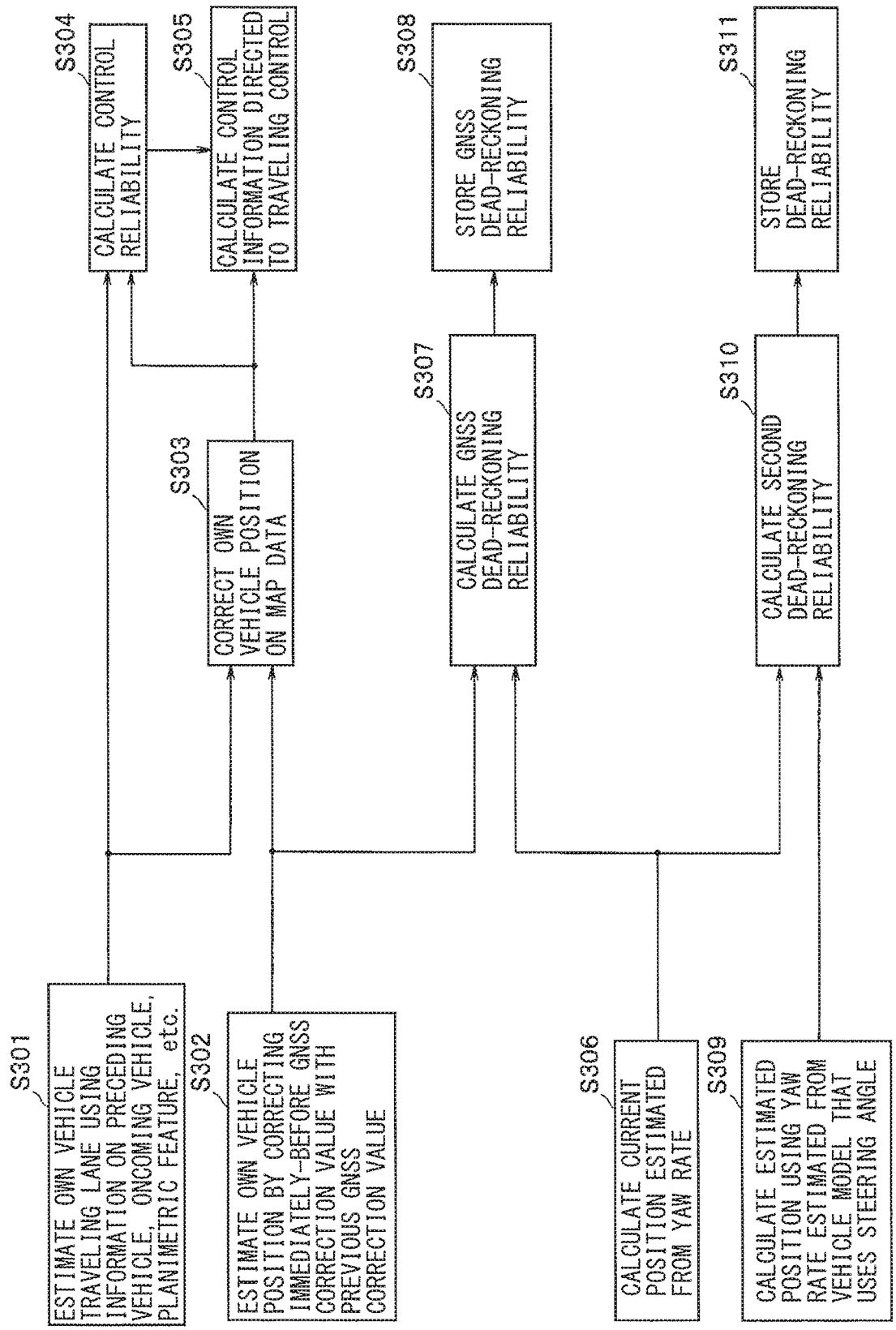
FIG. 4 is a diagram illustrating an example of a procedure for calculating the traveling route information and the estimated position reliability for a situation where lane line information is unobtainable.
Figure 5:
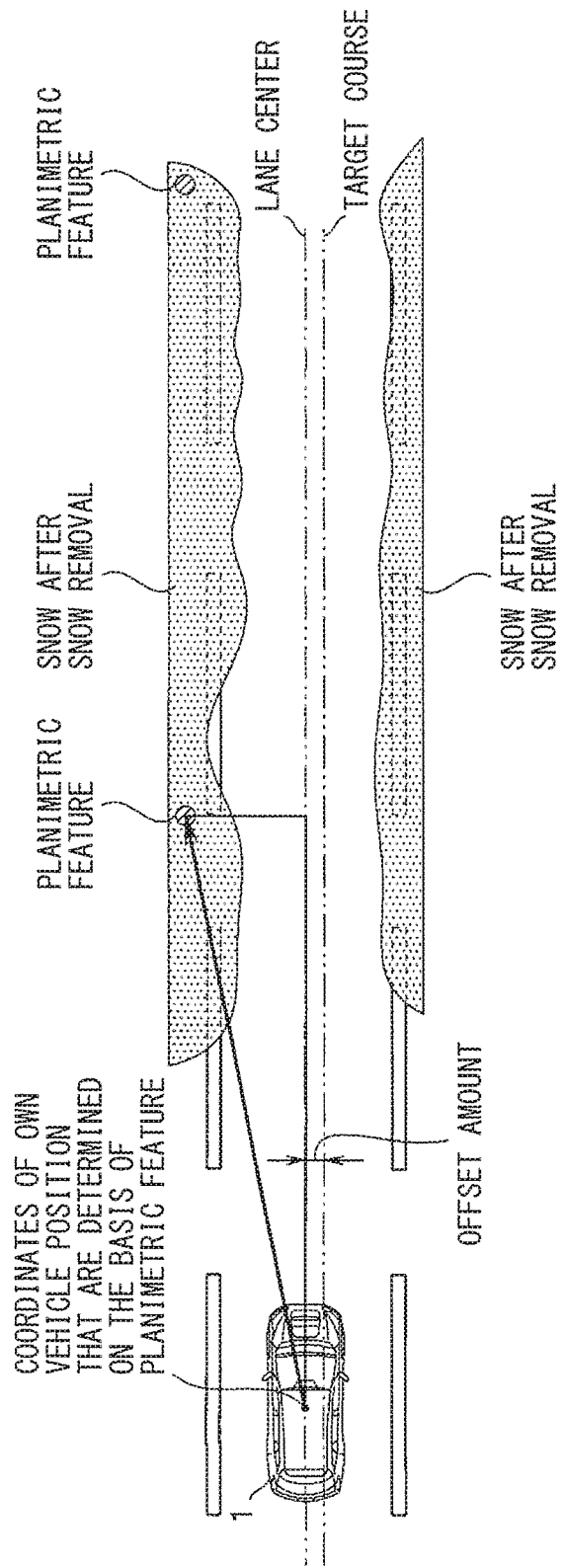
FIG. 5 is a diagram illustrating a relationship between lane center and a target course upon traveling along a snow road.

Processes performed as described above in step S103 may be performed in accordance with an example procedure illustrated in FIG. 4.

In step S301, the traveling controller 10 may estimate the own vehicle traveling lane by means of information on various three-dimensional objects that are other than the lane lines that have been recognized by the traveling environment recognizer 50. Non-limiting examples of various three-dimensional objects other than the lane lines may include a preceding vehicle, an oncoming vehicle, and a planimetric feature. For example, when the lane line information is unobtainable, the traveling controller 10 may estimate the curvature, or any other factor, of the own vehicle traveling lane on the basis of information other than information on the lane lines. The information other than the information on the lane lines may relate to, without limitation, a traveling trajectory of the preceding vehicle, a traveling trajectory of the oncoming vehicle, a shape of a guardrail, a road sign, and a traffic signal, which are recognized by the traveling environment recognizer 50. Further, for example, when a predetermined planimetric feature that corresponds to a planimetric feature recorded on the map information is recognized by the traveling environment recognizer 50, the traveling controller 10 may estimate the own vehicle position (or the own vehicle front-rear position) in the own vehicle traveling lane on the map data, through comparing a distance from the own vehicle 1 to the planimetric feature with coordinates of the corresponding planimetric feature along the map data. The predetermined planimetric feature may be any object present on the own vehicle traveling lane ahead of the own vehicle 1, such as a snow pole, a road sign, or a traffic signal.

In step S302, the traveling controller 10 may calculate an estimated position for the current own vehicle position. For example, the traveling controller 10 may correct the positioning information currently acquired by the positioning unit 70 through performing an operation similar to that performed in step S208. The traveling controller 10 may use, as the previous GNSS correction value, the GNSS correction value that is calculated immediately before (or most-recently before) the lane line information becomes unobtainable to thereby correct the positioning information currently acquired by the positioning unit 70. By correcting the positioning information currently acquired by the positioning unit 70 in this way, the traveling controller 10 may thereby calculate the estimated position for the current own vehicle position. The previous GNSS correction value may be, in other words, a previous correction value.

In step S303, when the calculation of the own vehicle position that is based on the planimetric feature or any other factor on the map data has been performed in step S301, the traveling controller 10 may correct the estimated position calculated in step S302 by means of the own vehicle position that is based on that planimetric feature or any other factor. Further, the traveling controller 10 may correct the previous (or most-recent) GNSS correction value, i.e., the previous correction value, on the basis of a correction amount used upon correcting the estimated position.

In step S304, the traveling controller 10 may calculate control reliability directed to execution of the traveling control, on the basis of the own vehicle traveling lane estimated in step S301 and the own vehicle position (i.e., the estimated position) estimated in step S302, for example. In an alternative implementation, in step S304, the traveling controller 10 may calculate the control reliability, on the basis of the own vehicle traveling lane estimated in step S301 and the own vehicle position (i.e., the estimated position) corrected in step S303, for example. In this calculation of the control reliability, for example, a level of coincidence between a shape (such as a curvature) of the own vehicle traveling lane estimated in step S301 and the road shape (such as a curvature) on the map data which corresponds to the own vehicle position (i.e., the estimated position) estimated in step S302 may be calculated by means of a predetermined method. In the alternative implementation, a level of coincidence between the shape (such as the curvature) of the own vehicle traveling lane estimated in step S301 and the road shape (such as the curvature) on the map data which corresponds to the own vehicle position (i.e., the estimated position) corrected in step S303 may be calculated by means of a predetermined method. A level of the thus-calculated control reliability may become higher as the level of coincidence becomes higher.

In step S305, when the control reliability calculated in step S304 is equal to or greater than a set threshold, the traveling controller 10 may set a target course directed to the execution of the traveling control (or the automatic driving control), and may calculate control information that is based on the set target course. For example, for the control information, the traveling controller 10 may calculate a control parameter such as a curvature, a yaw angle, or a lateral position which is based on the set target course.

Accordingly, in the abnormal situation in which the lane line information of the own vehicle traveling lane is unobtainable, the traveling controller 10 may calculate the control reliability by means of the positioning information and the travel environment information that is other than the lane line information. Further, in a case where the calculated control reliability is equal to or greater than a predetermined threshold, the traveling controller 10 may calculate the control information directed to the execution of the traveling control after having located the own vehicle position.

It is to be noted that the target course is basically set along the center of a lane of a road along which the own vehicle 1 travels, but setting the target course along the lane center is not necessarily appropriate when traveling along a snow road. For example, referring to FIG. 5, the actual lane center and the apparent lane center may sometimes differ from each other due to entry, into a road, of a part of snow that has been removed and placed at a road shoulder, or due to entry of any other factor into a road. Hence, in one implementation, the traveling controller 10 may store an amount of offset from the lane center which belongs to a timing at which steering force is released, when an input of steering that causes the own vehicle 1 to be offset from the lane center is performed by the driver upon traveling along the snow road, for example. Further, in one implementation, the traveling controller 10 may cause the target course to be offset from the lane center by the stored amount of offset, during a period in which the lane line information is unobtainable due to the snow accumulation, or due to any other factor.

In step S306, the traveling controller 10 may calculate (i.e., may perform dead-reckoning of) an estimated position for the current own vehicle position, on the basis of the kinetic state of the own vehicle 1 and the own vehicle position that is localized immediately before (or most-recently before) the lane line information becomes unobtainable. For example, the traveling controller 10 may calculate (i.e., may perform dead-reckoning of) the estimated position for the current own vehicle position, on the basis of the kinetic state of the own vehicle 1 and the own vehicle position last calculated in step S201. In an alternative implementation, the traveling controller 10 may calculate (i.e., may perform dead-reckoning of) the estimated position for the current own vehicle position, on the basis of the kinetic state of the own vehicle 1 and the own vehicle position calculated, after the calculation performed in step S201, on the basis of the planimetric feature or any other factor in step S301. For example, the kinetic state of the own vehicle 1 may be calculated by means of the yaw rate.

In step S307, the traveling controller 10 may calculate GNSS dead-reckoning reliability as estimated position reliability, on the basis of a comparison between the estimated position calculated in step S302 and the estimated position calculated in step S306, for example. In the present implementation, for example, the traveling controller 10 may calculate a reliability correction value that corresponds to a deviation between the estimated position calculated in step S302 and the estimated position calculated in step S306, and may calculate new GNSS dead-reckoning reliability through adding the thus-calculated reliability correction value to a previous value of the GNSS dead-reckoning reliability. The thus-calculated reliability correction value may take a positive value when the aforementioned deviation between the estimated position calculated in step S302 and the estimated position calculated in step S306 is equal to or less than a predetermined value, and may take a negative value when the same deviation is greater than the same predetermined value. Accordingly, a value of the GNSS dead-reckoning reliability may cumulatively become higher as a state in which the deviation is equal to or less than the predetermined value lasts longer. However, in the present implementation in which the estimated position for the own vehicle position is cumulatively calculated on the basis of the own vehicle position that is localized immediately before (or most-recently before) the lane line information becomes unobtainable in step S306 as described above, a detection error such as a yaw rate detection error may possibly be accumulated in the estimated position for the own vehicle position unless the new own vehicle position is newly calculated in step S301. Accordingly, the GNSS dead-reckoning reliability may basically decrease cumulatively as time elapses from the moment at which the lane line information becomes unobtainable.

In step S308, the traveling controller 10 may store the GNSS dead-reckoning reliability calculated in step S307 in the memory provided in the traveling controller 10.

In step S309, the traveling controller 10 may estimate the yaw rate from, for example, the vehicle model that uses the steering angle. Further, the traveling controller 10 may calculate (i.e., may perform dead-reckoning of) an estimated position for the current own vehicle position, on the basis of the kinetic state of the own vehicle 1 and the own vehicle position that is localized immediately before (or most-recently before) the lane line information becomes unobtainable. For example, the traveling controller 10 may calculate (i.e., may perform dead-reckoning of) the estimated position for the current own vehicle position, on the basis of the kinetic state of the own vehicle 1 and the own vehicle position last calculated in step S201. In an alternative implementation, the traveling controller 10 may calculate (i.e., may perform dead-reckoning of) the estimated position for the current own vehicle position, on the basis of the kinetic state of the own vehicle 1 and the own vehicle position calculated, after the calculation performed in step S201, on the basis of the planimetric feature or any other factor in step S301. For example, the kinetic state of the own vehicle 1 may be calculated by means of the estimated yaw rate.

In step S310, the traveling controller 10 may calculate the second dead-reckoning reliability as estimated position reliability, on the basis of a comparison between the estimated position calculated in step S306 and the estimated position calculated in step S309. In the present implementation, for example, the traveling controller 10 may calculate a reliability correction value that corresponds to a deviation between the estimated position calculated in step S306 and the estimated position calculated in step S309, and may calculate new second dead-reckoning reliability through adding the thus-calculated reliability correction value to a previous value of the second dead-reckoning reliability. The thus-calculated reliability correction value may take a positive value when the aforementioned deviation between the estimated position calculated in step S306 and the estimated position calculated in step S309 is equal to or less than a predetermined value, and may take a negative value when the same deviation is greater than the same predetermined value. Accordingly, a value of the second dead-reckoning reliability may cumulatively become higher as a state in which the deviation is equal to or less than the predetermined value lasts longer. However, in the present implementation in which the estimated position for the own vehicle position is cumulatively calculated on the basis of the own vehicle position that is localized immediately before (or most-recently before) the lane line information becomes unobtainable in steps S306 and S309 as described above, for example, a detection error such as the yaw rate detection error or a steering angle detection error may possibly be accumulated in the estimated position for the own vehicle position unless the new own vehicle position is newly calculated in step S301. Accordingly, the second dead-reckoning reliability may basically decrease cumulatively as time elapses from the moment at which the lane line information becomes unobtainable.

In step S311, the traveling controller 10 may store the second dead-reckoning reliability calculated in step S310 in the memory provided in the traveling controller 10.

When the flow proceeds to step S104 from step S102 in the flowchart illustrated in FIG. 2, the traveling controller 10 may determine whether the control information directed to the control of the own vehicle 1 in the normal situation has been calculated. For example, the traveling controller 10 may determine whether the current control reliability is equal to or greater than a predetermined threshold, and whether the control information directed to the execution of the traveling control has been calculated.

The flow may proceed to step S107 when the traveling controller 10 determines in step S104 that the control information has been calculated (S104: YES). The flow may proceed to step S108 when the traveling controller 10 determines in step S104 that the control information has not been calculated (S104: NO).

When the flow proceeds to step S105 from step S103, the traveling controller 10 may determine whether the control information directed to the control of the own vehicle 1 in the abnormal situation has been calculated. For example, the traveling controller 10 may determine whether the current control reliability is equal to or greater than a predetermined threshold, and whether the control information directed to the execution of the traveling control has been calculated.

The flow may proceed to step S106 when the traveling controller 10 determines in step S105 that the control information has been calculated (S105: YES). The flow may proceed to step S108 when the traveling controller 10 determines in step S105 that the control information has not been calculated (S105: NO).

When the flow proceeds to step S106 from step S105, the traveling controller 10 may determine whether the currently-calculated estimated position reliability is equal to or less than a set threshold. For example, the traveling controller 10 may determine whether the currently-calculated estimated position reliability is equal to or less than reliability of fifty percent. Note that the set threshold is not limited to the reliability of fifty percent.

The flow may proceed to step S107 when the traveling controller 10 determines in step S106 that all of the estimated position reliabilities are greater than the set threshold (S106: NO). The flow may proceed to step S108 when the traveling controller 10 determines in step S106 that one or more of the estimated position reliabilities is equal to or less than the set threshold (S106: YES).

When the flow proceeds to step S107 from step S104 or S106, the traveling controller 10 may execute the traveling control on the basis of the currently-calculated control information. The flow may exit the routine thereafter.

When the flow proceeds to step S108 from step S104, S105, or S106, the traveling controller 10 may discontinue the traveling control in a case where the traveling control is currently in execution. The flow may exit the routine thereafter.

According to the foregoing example implementation, the plurality of estimated positions related to the current position of the own vehicle may be calculated on the basis of the plurality of computing methods that use the information on the most-recent position of the own vehicle. Further, the estimated position reliability may be calculated on the basis of a result of comparison between the pieces of positional information, including the information on one or more estimated positions. In a case where the lane line information is undetectable due to the snow accumulation or any other factor that makes the lane line information undetectable, the control information directed to the traveling control may be computed by means of the information on one or more of the plurality of estimated positions. In the foregoing example implementation, when the own vehicle position on the map information is newly calculated on the basis of information on any planimetric feature acquired as the traveling environment information, the estimated position may be calculated on the basis of information on the newly-calculated own vehicle position even in the case where the lane line information is undetectable. Thus, the traveling control is continued until one or more of the estimated position reliabilities becomes equal to and less than a threshold even in the case where the lane line information becomes undetectable. Hence, it is possible to continue an appropriate traveling control even in a case where the lane line information becomes unobtainable due to, without limitation, the snow accumulation.

For example, when the lane line information becomes unobtainable by the traveling environment recognizer 50 due to, for example, the snow accumulation, it may possibly become difficult to directly recognize a traveling route of the own vehicle 1 from the traveling environment information, and may possibly become difficult to directly correct the positioning information using the traveling environment information as well. In contrast, even in such a case, one implementation makes it possible to calculate the estimated position for the current own vehicle position through, for example, correcting the currently-acquired positioning information with the previous GNSS correction value. The previous GNSS correction value is a piece of information related to the most-recent own vehicle position calculated on the basis of the lane line information.

In addition, for example, one implementation makes it possible to calculate the estimated position for the current own vehicle position on the basis of the kinetic state of the own vehicle 1 and the most-recent own vehicle position calculated on the basis of the lane line information. The kinetic state of the own vehicle 1 may be calculated by means of the yaw rate, for example.

In addition, for example, one implementation makes it possible to calculate the estimated position for the current own vehicle position on the basis of the kinetic state of the own vehicle 1 and the most-recent own vehicle position calculated on the basis of the lane line information. The kinetic state of the own vehicle 1 may be calculated by means of the yaw rate that is estimated from the vehicle model that uses the steering angle, for example.

By computing the control information by means of one or more of these estimated positions, one implementation makes it possible to continue the traveling control. In such an implementation, when the own vehicle position on the map information is newly calculated on the basis of the information on any planimetric feature acquired as the traveling environment information, the estimated position may be calculated on the basis of the information on the newly-calculated own vehicle position even in the case where the lane line information is unobtainable. Thus, it is possible to prevent a cumulative decrease in the estimated position reliability and to achieve the continuous traveling control even for the snow road, or for any road that involves difficulties in acquiring the lane line information. Further, in such an implementation, the cumulatively-variable estimated position reliability may be calculated on the basis of the result of comparison between the pieces of positional information, including the information on one or more estimated positions. The estimated positions may be acquired on the basis of methods which are different from each other, and the continuation of the traveling control upon a situation where the lane line information becomes unobtainable is limited to a point at which any of the estimated position reliabilities becomes equal to or less than the set threshold. Hence, one implementation makes it possible to achieve an appropriate traveling control without continuing, on the basis of information that involves low reliability, a traveling control more than necessary.

In addition, in one implementation, the estimated position reliabilities may be multiply calculated from any of various combinations of the pieces of positional information, including the information on one or more estimated positions, and the traveling control may be discontinued in a case where any of the estimated position reliabilities becomes equal to or less than the set threshold. Hence, one implementation makes it possible to continue the traveling control with a high degree of reliability.

Further, in one implementation where the lane line information is unobtainable due to, for example, the snow accumulation, the amount of offset that is set on the basis of the input of operation performed by the driver may be stored, the target course that is offset from the lane center on the map information by the offset amount may be set, and the control information may be calculated on the basis of the set target course. Such an implementation makes it possible to achieve the traveling control without involving a sense of discomfort even in a case where the actual lane center and the apparent lane center differ from each other due to, for example, the snow accumulation.

It is to be noted that, in a traveling control of a vehicle in general, there is a case where information directed to recognition of a traveling route of an own vehicle temporarily becomes unobtainable. For example, the information may temporarily become unobtainable in a case where a lane becomes unrecognizable via an in-vehicle camera due to, for example, snow accumulation. However, even in such a case where predetermined information temporarily becomes unobtainable, it is desirable that execution of the traveling control be continued as long as possible from a viewpoint of, for example, maintaining the driver's convenience.

The traveling controller 10 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the traveling controller 10. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the traveling controller 10 illustrated in FIG. 1.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle control system for vehicle, the vehicle control system comprising: a traveling controller configured to:
perform a traveling control of an own vehicle, on a basis of map information, positioning information that indicates a position of the own vehicle by means of a satellite navigation, and lane line information acquired as traveling environment information and related to a lane line ahead of the own vehicle;
calculate estimated positions, on a basis of a plurality of computing methods that are based on information on a most-recent position on map information of the own vehicle, the most-recent position of the own vehicle being calculated on a basis of the lane line information, the estimated positions each being related to a current position of the own vehicle;
and calculate estimated position reliability, on a basis of a result of a comparison between pieces of positional information, including information on one or more of the plurality of estimated positions, wherein the estimated position reliability is calculated so that the estimated position reliability cumulatively becomes higher as a state in which a deviation between the pieces of positional information is equal to or less than the predetermined value lasts longer, wherein, when the lane line information is unobtainable, the traveling controller is configured to:
calculate a first localized position that indicates a position of the own vehicle in the own vehicle traveling lane on the map information, on basis of the map information, the positioning information and information on three-dimensional objects acquired as the traveling environment information;
calculate a first estimated position that is one of the estimated positions, on basis of a most-recent satellite navigation correction value and the positioning information;
calculate a second estimated position that is one of the estimated positions, by dead-reckoning;
calculate a satellite navigation dead-reckoning position reliability as the estimated position reliability, on basis of a deviation between the first estimated position and the second estimated position;
and perform the traveling control by means of the first localized position and the map information until the estimated position reliability becomes equal to or less than a threshold, wherein the traveling controller, when calculating the first localized position, is configured to:
extract objects other than the lane line whose corresponding coordinates are recorded on the map information from the three-dimensional objects acquired as the traveling environment information;
determine distances from the own vehicle to the extracted objects based on the traveling environment information;
and calculate the first localized position through comparing the coordinates of the extracted objects with the determined distances.

2. The vehicle control system for vehicle according to claim 1, wherein, when the lane line information is unobtainable, the traveling controller stores an amount of offset set by a driver of the own vehicle, sets a target course that is in the own vehicle traveling lane and offset, by the amount of offset set by the driver, from lane center on the map information, and performs the traveling control on a basis of the target course.

3. The vehicle control system for vehicle according to claim 1, wherein, when the lane line information is obtainable, the traveling controller configured to:
calculate a second localized position that indicates a position of the own vehicle in the own vehicle traveling lane on the map information, on basis of the map information, the positioning information and the lane line information;

calculate a satellite navigation correction value that corresponds to a deviation between the positioning information and the second localized position; and perform the traveling control by means of the second localized position and the map information.

4. A vehicle control system for vehicle, the vehicle control system comprising:

a traveling controller configured to perform a driving assist of an own vehicle that include automatic driving in which a driver's operation is not required, on a basis of map information, positioning information that indicates a position of the own vehicle by means of a satellite navigation, and lane line information acquired as traveling environment information and related to a lane line ahead of the own vehicle, wherein, when the lane line information is unobtainable, the traveling controller is configured to:

calculate a first localized position that indicates a position of the own vehicle in the own vehicle traveling lane on the map information, on basis of the map information, the positioning information and an information on three-dimensional objects other than the lane line that are recognized as the traveling environment information;

calculate a first estimated position, on basis of a most-recent satellite navigation correction value and the positioning information;

calculate a second estimated position by dead-reckoning with a yaw rate of the own vehicle;

calculate a satellite navigation dead-reckoning position reliability on basis of a deviation between the first estimated position and the second estimated position, wherein the satellite navigation dead-reckoning position reliability cumulatively becomes higher as a state in which the deviation is equal to or less than a predetermined value lasts; and perform the driving assist by means of the first localized position and the map information until the satellite navigation dead-reckoning position reliability becomes equal to or less than a threshold, wherein the traveling controller, when calculating the first localized position, is configured to:

extract objects whose corresponding coordinates are recorded on the map information from the three-dimensional objects other than the lane line that are recognized as the traveling environment information;

determine distances from the own vehicle to the extracted objects on a basis of the traveling environment information;

and calculate the first localized position through comparing the coordinates of the extracted objects with the determined distances.

5. The vehicle control system for vehicle according to claim 4, wherein, when the lane line information is unobtainable, the traveling controller is further configured to:

calculate a third estimated position by dead-reckoning with an estimated yaw rate of the own vehicle that estimated from a steering angle;

calculate a second dead-reckoning reliability on basis of a deviation between the second estimated position and the third estimated position, wherein the second dead-reckoning reliability cumulatively become higher as a state in which the deviation is equal to or less than a predetermined value lasts; and perform the driving assist by means of the first localized position and the map information until the satellite navigation dead-reckoning position reliability or the second dead-reckoning reliability becomes equal to or less than a threshold.

6. The vehicle control system for vehicle according to claim 4, wherein, when the lane line information is unobtainable, the traveling controller stores an amount of offset set by a driver of the own vehicle, sets a target course that is in the own vehicle traveling lane and offset, by the amount of offset set by the driver, from lane center on the map information, and performs the traveling control on a basis of the target course.

7. The vehicle control system for vehicle according to claim 1, further comprising:

a stereo camera unit configured to recognize three-dimensional positions of at least one of snow poles, road signs or road signals relative to the own vehicle; and a storage device configured to store the map information, the map information includes coordinates of at least one of snow poles, road signs or road signals, wherein the traveling controller performs calculation of the first localized position by using i) the stored coordinates of at least one of the snow poles, the road signs or the road signals as the coordinates of the extracted objects and ii) distances determined from the recognized three-dimensional positions of at least one of the snow poles, the road signs or the road signals as the determined distances.

8. The vehicle control system for vehicle according to claim 2, further comprising:

a stereo camera unit configured to recognize three-dimensional positions of at least one of snow poles, road signs or road signals relative to the own vehicle; and a storage device configured to store the map information, the map information includes coordinates of at least one of snow poles, road signs or road signals, wherein the traveling controller performs calculation of the first localized position by using i) the stored coordinates of at least one of the snow poles, the road signs or the road signals as the coordinates of the extracted objects and ii) distances determined from the recognized three-dimensional positions of at least one of the snow poles, the road signs or the road signals as the determined distances.

9. The vehicle control system for vehicle according to claim 4, further comprising:

a stereo camera unit configured to recognize three-dimensional positions of at least one of snow poles, road signs or road signals relative to the own vehicle; and a storage device configured to store the map information, the map information includes coordinates of at least one of snow poles, road signs or road signals, wherein the traveling controller performs calculation of the first localized position by using i) the stored coordinates of at least one of the snow poles, the road signs or the road signals as the coordinates of the extracted objects and ii) distances determined from the recognized three-dimensional positions of at least one of the snow poles, the road signs or the road signals as the determined distances.

10. The vehicle control system for vehicle according to claim 6, further comprising:

a stereo camera unit configured to recognize three-dimensional positions of at least one of snow poles, road signs or road signals relative to the own vehicle; and a storage device configured to store the map information, the map information includes coordinates of at least one of snow poles, road signs or road signals, wherein the traveling controller performs calculation of the first localized position by using i) the stored coordinates of at least one of the snow poles, the road signs or the road signals as the coordinates of the extracted objects and ii) distances determined from the recognized three-dimensional positions of at least one of the snow poles, the road signs or the road signals as the determined distances.

11. The vehicle control system for vehicle according to claim 1, further comprising:
   a stereo camera unit configured to recognize three-dimensional positions of snow poles; and
   a storage device configured to store the map information, the map information includes coordinates of snow poles,
   wherein the traveling controller performs calculation of the first localized position by using i) the stored coordinates of the snow poles as the coordinates of the extracted objects and ii) distances determined from the recognized three-dimensional positions of the snow poles as the determined distances.

12. The vehicle control system for vehicle according to claim 2, further comprising:
   a stereo camera unit configured to recognize three-dimensional positions of snow poles; and
   a storage device configured to store the map information, the map information includes coordinates of snow poles,
   wherein the traveling controller performs calculation of the first localized position by using i) the stored coordinates of the snow poles as the coordinates of the extracted objects and ii) distances determined from the recognized three-dimensional positions of the snow poles as the determined distances.

13. The vehicle control system for vehicle according to claim 4, further comprising:
   a stereo camera unit configured to recognize three-dimensional positions of snow poles; and
   a storage device configured to store the map information, the map information includes coordinates of snow poles,
   wherein the traveling controller performs calculation of the first localized position by using i) the stored coordinates of the snow poles as the coordinates of the extracted objects and ii) distances determined from the recognized three-dimensional positions of the snow poles as the determined distances.

14. The vehicle control system for vehicle according to claim 6, further comprising:
   a stereo camera unit configured to recognize three-dimensional positions of snow poles; and
   a storage device configured to store the map information, the map information includes coordinates of snow poles,
   wherein the traveling controller performs calculation of the first localized position by using i) the stored coordinates of the snow poles as the coordinates of the extracted objects and ii) distances determined from the recognized three-dimensional positions of the snow poles as the determined distances.

* * * * *